(12) United States Patent
Wako et al.

(10) Patent No.: US 10,309,558 B2
(45) Date of Patent: Jun. 4, 2019

(54) BENT PRODUCT

(71) Applicant: Kurashiki Boseki Kabushiki Kaisha, Kurashiki-shi (JP)

(72) Inventors: Junichi Wako, Kurashiki (JP); Katsuya Ichinose, Kurashiki (JP)

(73) Assignee: KURASHIKI BOSEKI KABUSHIKI KAISHA, Kurashiki-Shi, Okayama (JP)

( * ) Notice: Subject to any disclaimer, the term of this patent is extended or adjusted under 35 U.S.C. 154(b) by 193 days.

(21) Appl. No.: 15/324,222

(22) PCT Filed: Jul. 13, 2015

(86) PCT No.: PCT/JP2015/069995
§ 371 (c)(1),
(2) Date: Jan. 5, 2017

(87) PCT Pub. No.: WO2016/006707
PCT Pub. Date: Jan. 14, 2016

(65) Prior Publication Data
US 2017/0198837 A1 Jul. 13, 2017

(30) Foreign Application Priority Data

Jul. 11, 2014 (JP) .................................. 2014-142913
Dec. 17, 2014 (JP) .................................. 2014-255491

(51) Int. Cl.
*F16L 9/18* (2006.01)
*F16L 9/00* (2006.01)
(Continued)

(52) U.S. Cl.
CPC ............ *F16L 9/003* (2013.01); *B21C 23/142* (2013.01); *B21D 7/00* (2013.01); *B29C 47/02* (2013.01);
(Continued)

(58) Field of Classification Search
CPC .............. F16L 9/003; F16L 9/165; F16L 9/19
(Continued)

(56) References Cited

U.S. PATENT DOCUMENTS 1,873,815 A * 8/1932 Brouner ............... H02G 3/0487
138/115
3,110,754 A * 11/1963 Witort .................. H02G 3/0481
138/114
(Continued)

FOREIGN PATENT DOCUMENTS

JP   H 04-309415 A   11/1992
JP   H 05-76943 A    3/1993
(Continued)

OTHER PUBLICATIONS

International Search Report (ISR) (PCT Form PCT/ISA/210), in PCT/JP2015/069995, dated Oct. 13, 2015.
(Continued)

*Primary Examiner* — Patrick F Brinson
(74) *Attorney, Agent, or Firm* — McGinn I.P. Law Group, PLLC.

(57) ABSTRACT

[Problem] To provide a bent product from an integrally extrusion molded body without the loss of lightweight properties or the like. [Solution] A bent product (10) that is formed by bending an integrally extrusion-formed body and has: a metal core material (20) provided with a tube-shaped peripheral wall (21) and a first partition wall (23) that extends in the longitudinal direction of the tube shape and divides the inner space of the peripheral wall in the direction of the major axis of the cross section perpendicular to the longitudinal direction of the tube shape; and a covering layer (40) that is formed on the outer surface of the core material and contains at least a thermoplastic resin. The thickness (t) of the peripheral wall is 0.8-2.3 mm, and a reinforcing
(Continued)

means is provided to the inner space side of the peripheral wall at a section (25) thereof to the inside of the bend.

15 Claims, 4 Drawing Sheets

(51) Int. Cl.
   *B21D 7/00* (2006.01)
   *B32B 15/02* (2006.01)
   *B29C 47/02* (2006.01)
   *B32B 15/085* (2006.01)
   *B29C 53/08* (2006.01)
   *F16L 9/147* (2006.01)
   *F16L 9/19* (2006.01)
   *B21C 23/14* (2006.01)
   *B29K 705/00* (2006.01)
   *B29L 23/00* (2006.01)
   *B21D 35/00* (2006.01)
   *B21D 47/04* (2006.01)

(52) U.S. Cl.
   CPC .............. *B29C 53/08* (2013.01); *B32B 15/02* (2013.01); *B32B 15/085* (2013.01); *F16L 9/147* (2013.01); *F16L 9/19* (2013.01); *B21D 35/007* (2013.01); *B21D 47/04* (2013.01); *B29K 2705/00* (2013.01); *B29L 2023/004* (2013.01)

(58) Field of Classification Search
   USPC ......... 138/172, 174, 145, 146, 177, 115–117
   See application file for complete search history.

(56) References Cited

U.S. PATENT DOCUMENTS

| | | | | |
|---|---|---|---|---|
| 3,625,258 | A * | 12/1971 | Phelps | F16L 9/18 138/115 |
| 5,294,468 | A * | 3/1994 | Chang | A47C 5/12 138/115 |
| 6,360,782 | B1 * | 3/2002 | Yoshitoshi | F01N 13/08 138/109 |
| 6,575,198 | B2 * | 6/2003 | Yoshitoshi | B21C 37/0803 138/115 |
| 7,841,368 | B2 * | 11/2010 | McMasters | B23P 6/007 138/109 |
| 2001/0037836 | A1 * | 11/2001 | Yoshitoshi | B21C 37/0803 138/115 |
| 2002/0195155 | A1 * | 12/2002 | Debaisieux | B21C 37/14 138/116 |
| 2012/0247600 | A1 * | 10/2012 | McNulty | B21C 37/151 138/117 |
| 2013/0171420 | A1 | 7/2013 | Yokota et al. | |

FOREIGN PATENT DOCUMENTS

| | | |
|---|---|---|
| JP | H 10-267174 A | 10/1998 |
| JP | H 10-286632 A | 10/1998 |
| JP | 2007-062276 A | 3/2007 |
| JP | 2012-066403 A | 4/2012 |

OTHER PUBLICATIONS

Practical Stamping Technical Manual, Version 2, Chief Editor: Wang Xiaopei, China Machine Press, pp. 97-99 (with an English translation). Oct. 2013.

* cited by examiner

BENT PRODUCT

FIELD OF INVENTION

The present invention relates to a bent product of an integrally extrusion-molded body having a metal core material used for a construction member and the like.

BACKGROUND OF THE INVENTION

An integrally extrusion-molded product in which an outer surface of a metal core material is pressed and coated with a thermoplastic resin is used as a construction member and the like. Patent Document 1 describes an integrally extrusion-molded body having a coating layer containing a polyolefin resin and wood flour on the outer surface of a core material made of metal such as aluminum and having a high-quality wooden texture.

In such an integrally extrusion-molded body, a hollow core material is used in many cases for weight reduction and the like. In that case, the core material can be deformed by a resin pressure during integral extrusion molding for providing the coating layer. In order to cope with this problem, Patent Document 2 describes an integrally extrusion-molded body in which a reinforcing partition member is provided inside the aluminum core material, and a relationship between a thickness of the core material and a span of the reinforcing partition member is regulated.

CITATION LIST

Patent Literature

Patent Document 1: Japanese Published Patent Application No. 2012-066403
Patent Document 2: Japanese Published Patent Application No. 2007-062276

SUMMARY OF INVENTION

Problem to be Solved by the Invention

Figure 3:
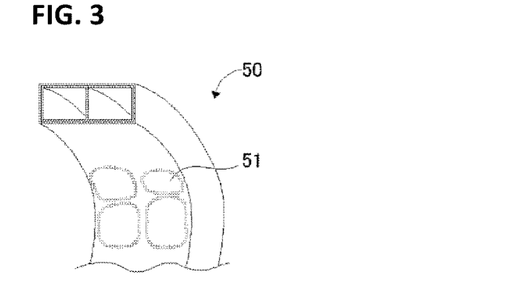
FIG. 3 is an example of an appearance defect of the bent product.
Figure 4:
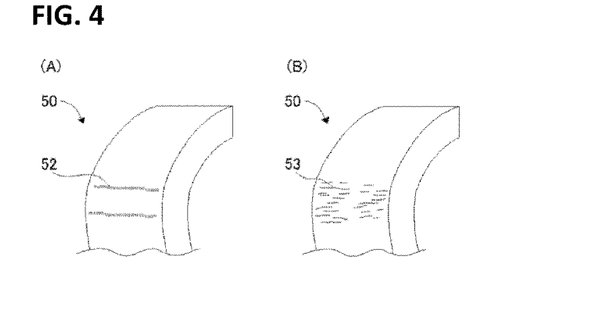
FIG. 4 is an example of an appearance defect of the bent product.

There has been a demand recently that the integrally extrusion-molded body as above is to be used for curved designs. However, with the integrally extrusion-molded body described in Patent Document 2, although deformation during the integral extrusion molding can be prevented, an appearance defect might occur in the case of bending. Specifically, as illustrated in FIG. 3, a dent 51 might be generated on an inner side of a bent portion of an integrally extrusion-molded body 50. Moreover, as illustrated in FIG. 4, a linear groove 52 extending in a width direction of the molded body or a hairline defect 53 might occur on a surface of the coating layer on an outer side of the bent portion. This problem can be solved by increasing the thickness of the core material, but that causes lightness of the material and workability in cutting/drilling or the like to be deteriorated, which is not preferable.

The present invention was made in view of the aforementioned circumstances and has an object to provide a bent product which a curved design is applied to by so-called curved surface machining and has favorable lightness, and an integrally extrusion-molded body suitable for bending.

Means for Solving Problem

In the light of the aforementioned object, the present invention utilizes a hollow core material comprising a peripheral wall and a partition wall inside the peripheral wall, and provides a reinforcing means inside the peripheral wall.

A bent product of the present invention is a bent product obtained by bending an integrally extrusion-molded body, the bent product having: a metal core material comprising a tubular peripheral wall and a first partition wall dividing an internal space of the peripheral wall in a long-diameter direction of a cross section perpendicular to a longitudinal direction of the tubular shape and extending in the longitudinal direction of the tubular shape; and a coating layer formed on an outer surface of the core material and containing at least a thermoplastic resin. Then, a thickness (t) of the peripheral wall is 0.8-2.3 mm, and a reinforcing means is provided on an internal space side of an inner side portion of the bending of the peripheral wall.

In this Specification, the term "integral extrusion molding" means extrusion molding of a material for a coating layer and at the same time coating the layer to the fed-in core material to integrate them, and a body formed by such a method is referred to as the integrally extrusion-molded body.

By means of such constitution, a bent product having lightness or the like can be obtained.

In an embodiment of the present invention, a bent plane of the bending is substantially orthogonal to a long-diameter direction of a cross section perpendicular to a longitudinal direction of the peripheral wall. The reinforcing means is the first partition wall, and a ratio Y (mm)/$t_i$ (mm) between a span (Y) of the first partition wall and a thickness ($t_i$) of the peripheral wall in the inner side portion of the bending is 12.0 or less.

Here, the span (Y) of the partition wall refers to a distance between two straight lines in parallel with the partition wall sandwiching the internal space divided by the partition wall in the cross section perpendicular to the longitudinal direction of the core material.

Moreover, the phrase "the bending plane is substantially orthogonal to the long-diameter direction of the cross section" means that they are orthogonal to each other within a range without any practical problem. The same also applies to the phrase "substantially in parallel" in the following.

In an embodiment of the present invention, the bending plane of the bending is substantially in parallel with the long-diameter direction of the cross section perpendicular to the longitudinal direction of the peripheral wall. The reinforcing means is a second partition wall provided in the metal core material, and the second partition wall divides a space surrounded by the inner side portion of the bending of the peripheral wall and the first partition wall in a short-diameter direction of the cross section perpendicular to the longitudinal direction of the peripheral wall and extends in the longitudinal direction of the peripheral wall, and a ratio Y (mm)/$t_i$ (mm) between a span (Y) of the second partition wall and the thickness ($t_i$) of the peripheral wall in the inner side portion of the bending is 12.0 or less.

In an embodiment of the present invention, the bending plane of the bending is substantially in parallel with the long-diameter direction of the cross section perpendicular to the longitudinal direction of the peripheral wall. The reinforcing means is a reinforcing member fitted/inserted into a space surrounded by the inner side portion of the bending of the peripheral wall and the first partition wall and extending in the longitudinal direction of the peripheral wall. The reinforcing member has a thickness of 0.8-3.0 mm and has a backing surface abutting on the inner side portion of the bending of the peripheral wall and a leg portion in parallel with the bending plane and formed continuously from the backing surface.

Preferably, a ratio H (mm)/$t_o$ (mm) between a cross-sectional height (H) of the core material and a thickness ($t_o$) of the peripheral wall in an outer side portion of the bending is 18.0 or less.

Here, the cross-sectional height (H) of the core material refers to a distance between two parallel straight lines sandwiching an outer shape of the core material in the cross section perpendicular to the longitudinal direction of the core material, that is, two straight lines in parallel with the bending plane.

Preferably, a ratio H (mm)/R (mm) between the cross-sectional height (H) of the core material and a radius of curvature (R) of the bending is 0.09 or less.

Here, a bending radius refers to a radius of curvature in the inner side portion of the bending of a bent product. If the radius of curvature is not uniform, it refers to a value of a portion having the smallest radius of curvature.

Preferably, the core material is made of aluminum. Here, the phrase "made of aluminum" also encompasses "made of an aluminum alloy" within its category.

Preferably, the coating layer contains at least a thermoplastic resin and wood flour. Moreover, the thermoplastic resin contained in the coating layer is preferably a polyolefin resin. Moreover, a thickness of the coating layer is preferably 0.1-5 mm.

Preferably, the bent product further has an adhesive layer formed between the core material and the coating layer. Moreover, preferably the adhesive layer contains at least a copolymer of α-olefin and epoxy group-containing unsaturated monomer. Moreover, a thickness of the adhesive layer is preferably 0.05-1.0 mm.

Moreover, a cross-sectional shape of the core material is preferably substantially rectangular.

Effect of the Invention

According to the present invention, a bent product without an appearance defect while maintaining lightness and favorable workability can be obtained.

DESCRIPTION OF EMBODIMENTS

First, dimensions, names and the like of a bent product of the present invention will be described on the basis of FIG. 10.

Figure 10:
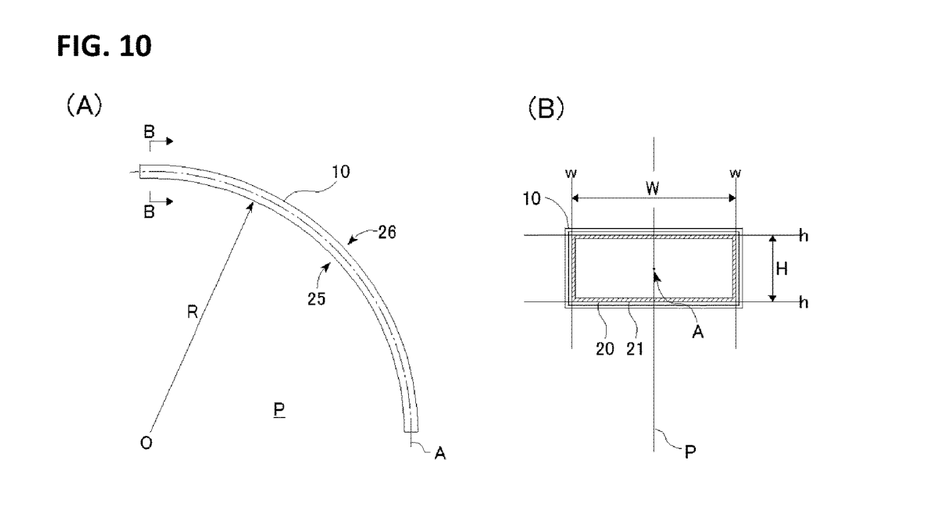
FIG. 10 are views illustrating an entirety of an example of a bent product of the present invention.

In FIG. 10(A), a bent product 10 of this embodiment is bent with a radius of curvature R around a bending center O as a center. A bending plane P is a plane on which a center axis A of the bent product 10 in a longitudinal direction is placed, and the bending plane P matches a paper surface in this figure. In the bent product, a side closer to the bending center O is referred to as an inner side 25 of the bending, while a side far from the bending center O as an outer side 26 of the bending.

FIG. 10(B) is a BB end surface view of FIG. 10(A) and illustrates a cross section perpendicular to the longitudinal direction of the bent product. Hereinafter, in this Specification, a simply referred term "cross section" means a cross section perpendicular to the longitudinal direction of the bent product and a core material. In FIG. 10(B), a shaded portion is a peripheral wall 21 of the core material 20, and a partition material inside the core material is omitted.

In the cross section of the core material 20, a distance between two parallel straight lines sandwiching an outer shape of the cross-sectional shape, which are two straight lines h and h substantially orthogonal to the bending plane is referred to as a cross-sectional height H of the core material 20. In the cross-sectional shape of the core material, a distance between two parallel straight lines sandwiching the outer shape of the core material, which are two straight lines w and w in parallel with the bending plane is referred to as a cross-sectional width W of the core material 20. As described above, the cross-sectional height H and the cross-sectional width W of the core material are determined by a relation with a bending direction of the core material.

In the cross section of the core material, a long diameter of the cross section is a long side if the cross section is a rectangle, it is a long diameter if the cross section is an ellipse, and if the cross section has an irregular shape, it is a largest distance between two parallel straight lines sandwiching its outer periphery. Similarly, a short diameter of the cross section is a short side if the cross section is a rectangle, it is a short diameter if the cross section is an ellipse, and if the cross section has an irregular shape, it is a smallest distance between two parallel straight lines sandwiching its outer periphery. In the example of FIG. 10(B), the cross section is a rectangle, the long diameter matches the cross-sectional width W, and the short diameter matches the cross-sectional height H. As described above, the long diameter and the short diameter of the core material are determined on the basis of the cross-sectional shape of the core material.

Figure 1:
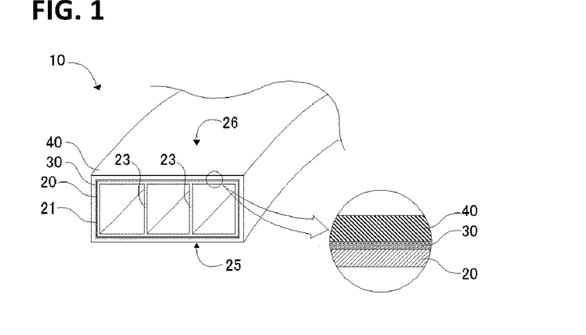
FIG. 1 is a view illustrating a structure of a bent product of a first embodiment of the present invention.
Figure 2:
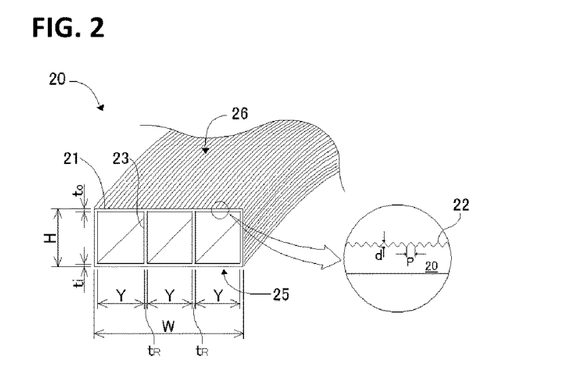
FIG. 2 is a view illustrating a structure of a core material of the bent product of the first embodiment of the present invention.

A structure of the bent product which is the first embodiment of the present invention will be described on the basis of FIGS. 1 and 2. In FIGS. 1 and 2, the cross section corresponds to a cross section perpendicular to the longitudinal direction of the core material, and lower sides of the figures correspond to the inner side of the bending, that is, a side having a smaller curvature of the bending, while upper sides of the figures illustrate the outer side of the bending.

In FIGS. 1 and 2, in the bent product 10 of this embodiment, a coating layer 40 is formed on an outer surface of the hollow core material 20 through an adhesive layer 30. The core material 20 of this embodiment has a tubular peripheral wall 21 having a rectangular cross section and two partition walls 23 dividing an internal space of the peripheral wall in the long-diameter direction of the cross section and extending in the longitudinal direction of the core material. The coating layer 40 contains at least a thermoplastic resin. The bent product 10 is bent in a plane (in a bending plane) in parallel with the partition walls 23 assuming the lower sides in the figures to be the inner side 25 of the bending and the upper side in the figures to be the outer side 26 of the bending.

In the bent product 10 in this embodiment, the long diameter in the cross section perpendicular to the longitudinal direction of the core material is orthogonal to the bending plane P, while the short diameter is in parallel with the bending plane P. In this embodiment, the partition walls 23 serve as reinforcing means against the appearance defect (defective shape) caused by compression deformation in the inner side portions 25 of the bending of the peripheral wall 21.

In this Specification, the partition walls are discriminated from each other in some cases by referring to the partition wall dividing the internal space of the peripheral wall in the long-diameter direction of the cross section as a first partition wall and the partition wall dividing the internal space of the peripheral wall in the short-diameter direction of the cross section as a second partition wall. The partition walls 23 in this embodiment are the first partition walls. In the following, a span Y and a thickness $t_R$ of the partition wall are used for the first partition wall or the second partition wall which is the reinforcing means against deformation caused by the bending unless otherwise specified.

In this embodiment, the core material 20 is made of aluminum or an aluminum alloy. Specifically, a material with a grade having favorable extrusion-moldablity as those used for an aluminum sash, for example a material with alloy numbers 6063 or 6060 according to JISH4100, is used.

A thickness t of the peripheral wall 21 of the core material 20 is 0.8-2.3 mm. If the peripheral wall is too thin, the appearance defect can easily occur during the bending, and production stability lowers in manufacture of the core material by extrusion molding of aluminum. On the other hand, if the peripheral wall is too thick, lightness and the like are deteriorated. From these viewpoints, the thickness t of the peripheral wall is preferably 1.0-1.9 mm, or more preferably 1.2-1.8 mm.

In the thickness t of the peripheral wall 21, a thickness of the inner side portion 25 of the bending is indicated as $t_i$, and a thickness of the outer side portion 26 of the bending is indicated as to. The thicknesses $t_i$ and $t_o$ may be different, but from a viewpoint of productivity of the core material, the thickness t of the peripheral wall 21 is preferably equal on the whole circumference.

The thickness $t_R$ of the partition wall 23 of the core material 20 is preferably 0.8-2.3 mm. If the partition wall is too thin, production stability is poor in the manufacture of the core material by aluminum extrusion molding. On the other hand, if the partition wall is too thick, lightness and the like are deteriorated. From these viewpoints, the thickness $t_R$ of the partition wall is more preferably 0.9-1.9 mm, or particularly preferably 1.0-1.8 mm.

The span Y of the partition wall 23 refers to a distance between two parallel straight lines sandwiching the internal space divided by the partition wall in the cross section perpendicular to the longitudinal direction of the core material 20, that is, two straight lines in parallel with the partition wall. In this embodiment, since the two partition walls are provided, three spans Y are indicated in FIG. 2. In any span, a ratio with the thickness $t_i$ of the peripheral wall in the inner side portion of the bending, Y (mm)/$t_i$ (mm) needs to be 12.0 or less, preferably 10.0 or less, or more preferably 9.0 or less. The smaller the ratio Y/$t_i$ is, the less easily a dent in the inner side of a worked portion is generated during the bending as will be described.

A lower limit of Y/$t_i$ is not particularly limited, but considering a reinforcement effect of the partition wall 23, a weight of the bent product 10, and a material cost, Y/$t_i$ is preferably 5.0 or more, or more preferably 10.0 or more.

In this embodiment, the cross-sectional height H of the core material 20 is a distance between the two parallel straight lines sandwiching the outer shape of the core material, that is, the two parallel straight lines perpendicular to the partition wall 23 in the cross section perpendicular to the longitudinal direction of the core material. In this embodiment, it is a height of the core material in FIG. 2 in a vertical direction. A ratio between the cross-sectional height H of the core material and the thickness to of the peripheral wall 21 in the outer side portion of the bending, H (mm)/$t_o$ (mm) is preferably 18.0 or less, more preferably 16.0 or less, and particularly preferably 14.0 or less. The smaller the ratio H/$t_o$ is, the less easily a linear defect or a hairline defect is generated on the surface of the coating layer on the outer side of the worked portion during the bending as will be described later.

A lower limit of H/$t_o$ is not particularly limited, but considering the weight of the bent product 10 and a material cost, H/$t_o$ is preferably 10.0 or more, or more preferably 15.0 or more.

A ratio between the cross-sectional height H of the core material and the radius of curvature R of the bending, H (mm)/R (mm) is preferably 0.09 or less, more preferably 0.07 or less, and particularly preferably 0.05 or less. The smaller the ratio H/R is, the less easily the linear defect or the hairline defect is generated on the surface of the coating layer on the outer side of the worked portion during the bending as will be described later.

A lower limit of H/R is not particularly limited, but in order to obtain an esthetic effect by the bending, it is preferably 0.005 or more, or more preferably 0.010 or more.

An entire dimension of the core material 20 is not particularly limited other than the above but may be set as appropriate in accordance with an application of the bent product to be obtained. Considering that rigidity and surface decorativeness are required as a construction member, the cross-sectional height H of the core material and the cross-sectional width W in the direction orthogonal to the height are preferably 20 mm or more, or more preferably 30 mm or more.

Here, a stress and deformation when the integrally extrusion-molded body is to be bent in order to manufacture the bent product of this embodiment will be described.

Figure 5:
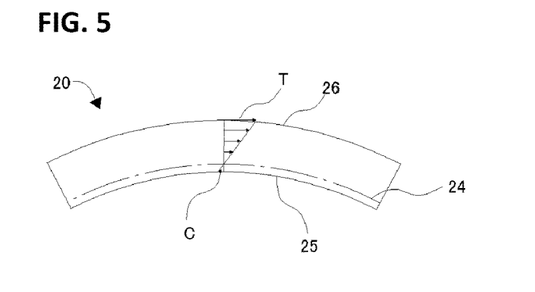
FIG. 5 is a view for explaining a stress and deformation in bending of an integrally extrusion-molded body.

In FIG. 5, when the integrally extrusion-molded body is bent, a compressive stress C is generated in the inner side portion 25 of the bending and a tensile stress T in the outer side portion 26 in the core material 20 at a boundary of a neutral surface 24 whose length is not changed even by bending deformation.

By means of this compressive stress C, if the peripheral wall 21 on the inner side of the bending portion is buckled, a dent is generated. In this embodiment, by setting the ratio $Y/t_i$ to 12.0 or less, the dent 51 as illustrated in FIG. 3 is not generated easily. Moreover, since the coating layer and the adhesive layer constituted by a resin is more flexible than metal such as aluminum, they easily follow deformation, but even if the peripheral wall is not buckled, if adhesion between the core material and the adhesive layer and/or the coating layer is broken, wrinkles are generated on the surface of the coating layer. If a powder body such as wood flour is added to the coating layer, the wrinkles are generated more easily.

On the other hand, if the peripheral wall 21 on the outer side of the bending portion is fractured by the tensile stress T, a linear groove is generated on the surface of the coating layer. The tensile stress and an elongation rate of the deformation are the largest on the outermost edge of the bending portion. In this embodiment, by setting the ratio $H/t_o$ to 18.0 or less, the linear groove 52 as illustrated in FIG. 4(A) is not generated easily. Even if the peripheral wall is not fractured, if the adhesive layer and/or the coating layer cannot follow elongation, a hairline defect can be generated on the surface of the coating layer. In the present invention, by setting the ratio $H/t_o$ to 18.0 or less, the hairline defect 53 as illustrated in FIG. 4(B) is not generated easily, either.

Moreover, absolute amounts of elongation of the peripheral wall 21 on the outer side of the bending portion and the coating layer 40 depend on the ratio H/R. In this embodiment, by setting the ratio H/R to 0.09 or less, an appearance defect such as a hairline defect as illustrated in FIG. 4(B) is not generated easily.

As described above, in order to prevent the appearance defect in the bending, it is important to set the ratio Y/t within the aforementioned range. Moreover, the defects on the outer side of the bending portion are not generated easily as the defects on the inner side, but in order to prevent them, the ratio $H/t_o$ is preferably set within the aforementioned range. Moreover, the ratio H/R is preferably set within the aforementioned range.

In the integrally extrusion-molded body suitable for manufacture of the bent product of this embodiment, the ratio $Y/t_{min}$ and the ratio $H/t_{min}$ are preferably set within the aforementioned range, respectively, with respect to a minimum value $t_{min}$ of the thickness t of the peripheral wall 21. As a result, a direction of the bending is not limited. Moreover, the ratio H/R is preferably set within the aforementioned range.

Returning to FIG. 2, here, with the purpose of further improvement of adhesion between the core material 20 and the coating layer 40 or the adhesive layer 30, knurling and/or anodic oxidization is preferably applied before formation of the coating layer 40 or the adhesive layer 30 which will be described later. When the knurling and the anodic oxidation are both applied, the anodic oxidation is preferably applied after the knurling is applied.

The knurling is processing for forming a groove in the outer surface of the core material, whereby the adhesion between the coating layer or the adhesive layer and the core material is further improved. When the knurling is to be applied to the core material, the core material only needs to have a groove along the longitudinal direction at least in a coating layer or adhesive layer forming region on the outer surface. For example, the core material may have the groove only in the coating layer or adhesive layer forming region or may have the groove also in a region other than the coating layer or the adhesive layer forming region. From the viewpoint of adhesion with the coating layer or the adhesive layer, the groove 22 is preferably formed on the whole surface of the outer surface of the core material 20, for example, as illustrated in FIG. 2. By forming the groove 22 along the longitudinal direction of the core material, the groove can be given at the same time as molding of the core material, and a more uniform groove can be formed efficiently. In the present invention, the core material is not prevented from having a groove in a direction substantially perpendicular to the longitudinal direction or a projection and a recess by embossing, for example, other than the groove in the core material longitudinal direction, but from the viewpoint of productivity, having only the groove in the longitudinal direction is preferable. That is because, by having only the groove in the longitudinal direction, favorable adhesion can be ensured between the core material and the coating layer or the adhesive layer.

A depth d of the groove 22 by the knurling is preferably 0.03-1.0 mm, or more preferably 0.05-0.35 mm. A pitch p of the groove 22, that is, an interval of a deepest portion between the adjacent grooves is preferably 0.03-1.5 mm, or more preferably 0.05-1.0 mm. The depth d and the pitch p of the groove is indicated as an average value of values measured at arbitrary three spots per length of 1 m in the longitudinal direction of the core material. A measuring method is not particularly limited, but a method using a micro gauge is easy. Alternatively, the depth may be measured by projecting a laser beam. The depth and the pitch can be measured also by a method of confirming a cut cross section by a microscope.

A shape of the groove 22 is not particularly limited but a cross-sectional shape of a projection and a recess formed by the groove may have a form in which a projecting portion and a recessed portion each having a substantially triangular shape continue as illustrated in FIG. 2, for example, or may have a form in which the projecting portion and the recessed portion each having a substantially arc shape continue.

The anodic oxidation is processing for forming an oxide film on the surface of the metal core material, and a principle of a general anodic oxidation method can be employed as it is. As a result, the adhesion between the coating layer or the adhesive layer and the core material is further improved. The anodic oxidation of the aluminum core material is particularly referred to as alumite treatment. In the general alumite treatment, a sealing treatment might be executed as a post process in some cases. The sealing treatment is to prevent a bad influence such as deterioration of erosion resistance or the like caused by micro pores generated in the anodic oxidation, and a method of treatment in a pressurized steam or a method of treatment in an aqueous solution of nickel acetate/cobalt acetate is used. However, in the present invention, the core material in a stage without executing the sealing treatment is preferably used. That is because an adhesive force with the coating layer or the adhesive layer is greatly improved by the micro pores on the surface of the oxide film.

The coating layer 40 is a resin layer containing at least a thermoplastic resin which is a base resin. As the thermoplastic resin, a polyolefin resin is preferable. The polyolefin resin is a homopolymer or a copolymer containing one or two or more kinds of α-olefin as a monomer. The α-olefin includes α-olefin with a carbon atom number of 2-8, or preferably 2-6 such as ethylene, propylene, isobutylene, and hexene, for example. The preferable α-olefin is ethylene and propylene. The polyolefin resin may contain other monomers as a monomer other than α-olefin. Those other monomers include vinylester monomer such as vinyl acetate, for example.

A specific example of the polyolefin resin includes polyolefin such as polyethylene, polypropylene, and ethylene-propylene copolymer, ethylene-vinyl acetate copolymer and the like. A preferable polyolefin resin is polyolefin, or particularly polyethylene and polypropylene.

The polyolefin resin is preferably modified by unsaturated carboxylic acid. Since the unsaturated carboxylic acid modified polyolefin resin has relatively high compatibility with wood flour in the coating layer, the adhesion between the coating layer and the adhesive layer can be further improved.

The unsaturated carboxylic acid is a compound having one or more unsaturated bonds and one or more carboxyl groups in one molecule. A specific example of the unsaturated carboxylic acid includes unsaturated monocarboxylic acid such as acrylic acid, methacrylic acid, ethacrylic acid, crotonic acid, unsaturated dicarboxylic acid such as itaconic acid, maleic acid and fumaric acid, and derivatives thereof. The derivatives of the unsaturated carboxylic acid include chlorides, amides, esters and anhydrides of the aforementioned acids. Esters of the aforementioned acids include methyl ester, ethyl ester, propyl ester, dimethylaminoethyl ester and the like. A preferable unsaturated carboxylic acid is unsaturated dicarboxylic acid and its anhydride and its specific example includes maleic acid and maleic anhydride.

The modification by the unsaturated carboxylic acid can be achieved by adding the unsaturated carboxylic acid in the system during polymerization or after polymerization of the aforementioned polyolefin resin. The unsaturated carboxylic acid modified polyolefin resin may have a form in which the unsaturated carboxylic acid is incorporated in a main chain of the polyolefin resin by an addition reaction, and a chemical bond is formed between the polyolefin resin and the unsaturated carboxylic acid or may have a form in which the unsaturated carboxylic acid is dispersed in the polyolefin resin without forming a chemical bond between the polyolefin resin and the unsaturated carboxylic acid or may have those forms in a composite manner.

A content of the unsaturated carboxylic acid in the unsaturated carboxylic acid modified polyolefin resin is preferably 0.1-15 wt. %, or particularly 0.1-10 wt % with respect to all the monomers in the unsaturated carboxylic acid modified polyolefin resin. Two or more kinds of the unsaturated carboxylic acid may be contained, and in that case, it is only necessary that their total amount is within the aforementioned range.

The polyolefin resin preferably has a melting point of 165° C. or less, or particularly 125-165° C. From the viewpoint of the integral extrusion molding, MFR (Melt flow rate) of the polyolefin resin is preferably 3-25 g/10 min, or particularly more preferably 3-15 g/10 min.

In this Specification, the melting point can be measured by using a differential scanning calorimetric analyzing device used in general and can be acquired by measuring a peak value of an endothermic peak involved in phase transition when a sample of approximately 5 mg is measured at a temperature rising speed of 10° C./min under a nitrogen atmosphere. The MFR is a value at 190° C. and a load of 2.16 kgf and can be measured on the basis of JISK7210.

The polyolefin-based resin can be manufactured by conventionally known methods such as a suspension polymerization method, a solution polymerization method and the like or is available as a commercial product. Particularly, a recycled product derived from a discarded polyolefin product can be used as polyolefin as a polyolefin resin. As a result, an environmental load is reduced, which is preferable. As a commercial product of the unsaturated carboxylic acid modified polyolefin resin, Yumex 1010 (by Sanyo Chemical Industries, Ltd.) or the like can be used, for example.

The coating layer may contain the unsaturated carboxylic acid as another component of the aforementioned polyolefin resin. The unsaturated carboxylic acid contained as another component of the polyolefin resin can improve compatibility between the polyolefin resin and wood flour and as a result, the adhesion between the coating layer and the adhesive layer can be further improved. Particularly, when polyolefin is used as the polyolefin resin, addition of the unsaturated carboxylic acid as another component of the polyolefin in the coating layer is effective from the viewpoint of further improvement of adhesion between the coating layer and the adhesive layer.

As the unsaturated carboxylic acid contained as another component of the polyolefin resin, a compound similar to the unsaturated carboxylic acid of the aforementioned unsaturated carboxylic acid modified polyolefin resin can be used, and preferable unsaturated carboxylic acid is unsaturated dicarboxylic acid and its anhydride, and its specific example includes maleic acid and maleic anhydride.

A content of the unsaturated carboxylic acid contained as another component of the polyolefin resin is preferably 0.2-10 wt. %, or more preferably 1.0-10 wt. % with respect to the polyolefin resin. Two or more kinds of unsaturated carboxylic acid may be contained, and in that case, it is only necessary that their total amount is within the aforementioned range.

The present invention does not prevent resins other than the polyolefin resin from being contained in the base resin. The other resins include acrylonitrile-butadiene-styrene resin, for example.

In the coating layer, wood flour is preferably added in order to give excellent appearances and tactile impression. As the wood flour, those obtained by crushing timber such as cedar, Japanese cypress, Western hemlock, timber offcuts and waste wood of those timbers and sawdust are often used and those having a particle size of 10-500 meshes can be used, but approximately 60-100 meshes are more preferable. When those obtained by crushing the timber offcuts and the waste wood are used as the wood flour, the environmental load is reduced, which is preferable.

A content of the wood flour is 5-50 weight parts, preferably 10-40 weight parts with respect to 100 weight parts of the polyolefin resin.

The coating layer may be a single layer type but may be also a multi-layer type of two or more layers. The multi-layer type coating layer only needs to be integrally molded with two or more of the coating layers within the aforementioned range.

A thickness of the coating layer is not particularly limited as long as the object of the present invention is achieved, and from the viewpoints of adhesion, appearance, and productivity, and in order not to generate a hairline defect or the like on the surface during the bending, it is preferably 0.1-5 mm. From the viewpoints of texture of wood when being touched and further improvement of the adhesion of the coating layer, the thickness of the coating layer is 0.6-3.0 mm, particularly preferably 1.0-2.0 mm. When the coating layer is a multi-layer type, it is only necessary that their total thickness is within the aforementioned range.

The coating layer may have a form of a so-called non-foaming body or a low foaming body with a high expansion ratio of 5 times or less, particularly twice or less.

The coating layer may contain various additives conventionally used for synthetic resins in order to improve various physical properties such as a coloring agent, a filling agent, an ultraviolet absorbent, an anti-static agent, a matting agent, a seed agent, a mica powder and grain, an organic fiber, a vermiculite powder, a glass chip, a used paper powder, a ceramic powder and the like, for example. As the coloring agent, known inorganic or organic pigments can be used. A content of the coloring agent is preferably 1-4 wt. % with respect to the polyolefin resin. As the filling agent, calcium carbonate, talc and the like can be used. A content of the filling agent is preferably 5-40 wt. % with respect to the polyolefin resin.

Subsequently, in coating the core material 20 with the coating layer 40, some adhesive is preferably used in order to improve adhesion strength between the both layers. The adhesive is not particularly limited as long as it has an adhesive force to aluminum and a resin which is the coating layer. Preferably, an adhesive layer of an elastic adhesive is provided between the core material 20 and the coating layer 40. Instead of the adhesive layer, the adhesive may be applied on the surface of the core material in advance by spraying, immersion and the like, and may be extrusion-molded integrally with the coating layer.

The adhesive layer 30 of this embodiment is a resin layer containing a polyolefin resin containing epoxy. Such epoxy group-containing polyolefin resin is a copolymer obtained by polymerizing at least α-olefin and an epoxy group-containing unsaturated monomer. By using the epoxy group-containing polyolefin resin, the adhesion between the adhesive layer and the coating layer and the adhesion between the adhesive layer and the core material are improved, and as a result, the adhesion of the coating layer to the core material is improved. Particularly, improvement of the adhesion between the adhesive layer and the coating layer is considered to be achieved because the epoxy group in the adhesive layer reacts with a hydroxyl group of cellulose constituting the wood flour in the coating layer so as to form a chemical bond (ether bond).

In the present invention, an effect of further improvement of the adhesion between the adhesive layer and the coating layer obtained by having the unsaturated carboxylic acid contained in the coating layer is considered to be achieved because the epoxy group in the adhesive layer reacts with the carboxyl group in the unsaturated carboxylic acid in the coating layer so as to form a chemical bond (ester bond).

As α-olefin constituting the epoxy group-containing polyolefin resin, a monomer similar to α-olefin constituting the aforementioned polyolefin resin can be exemplified. The preferable α-olefin includes ethylene and propylene.

The epoxy group-containing unsaturated monomer is a compound having one or more unsaturated bonds and one or more epoxy groups in one molecule, and includes glycidyl (meth)acrylate such as glycidyl acrylate, glycidyl methacrylate and the like. Among them, glycidyl (meth)acrylate is preferable. The glycidyl (meth)acrylate is supposed to inclusively mean glycidyl acrylate and glycidyl methacrylate.

The epoxy group-containing polyolefin resin may contain, as a monomer, monomers other than α-olefin and the epoxy group-containing unsaturated monomer. Those other monomers include: vinyl ester monomers such as vinyl acetate; acrylic monomer such as methyl acrylate, ethyl acrylate, propyl acrylate, methyl methacrylate, ethyl methacrylate, propyl methacrylate; styrene monomers such as styrene; and vinyl halide monomers such as vinyl chloride. As the aforementioned other monomers, one or more kind of monomers selected from a group consisting of vinyl ester monomer and acrylic monomer are preferably used, and more preferably, vinyl ester monomer or acrylic monomer is used. The preferable vinyl ester monomer is vinyl acetate. The preferable acrylic monomer is methyl acrylate.

Specific examples of the epoxy group-containing polyolefin resin include the following copolymers:

(1) α-olefin-epoxy group-containing unsaturated monomer copolymer;

(2) α-olefin-epoxy group-containing unsaturated monomer-vinyl ester monomer copolymer;

(3) α-olefin-epoxy group-containing unsaturated monomer-acrylic monomer copolymer;

(4) α-olefin-epoxy group-containing unsaturated monomer-styrene monomer copolymer;

(5) α-olefin-epoxy group-containing unsaturated monomer-vinyl halide monomer copolymer; and (6) α-olefin-epoxy group-containing unsaturated monomer-vinyl ester monomer-acrylic monomer copolymer.

In the aforementioned specific examples, the copolymers in (1), (2), (3), and (6) are preferable, the copolymers in (1), (2), and (3) are more preferable, and the copolymer in (2) is the most preferable.

From the viewpoint of improvement of the adhesion between the coating layer and the adhesive layer and the adhesion between the adhesive layer and the core material, a content of α-olefin in the epoxy group-containing polyolefin resin is preferably 60-95 wt. %, or more preferably 75-90 wt. % with respect to the total monomer components in the resin. Two or more kinds of α-olefin may be combined in use and in that case, it is only necessary that their total amount is within the aforementioned range.

From the viewpoint of improvement of the adhesion between the coating layer and the adhesive layer and the adhesion between the adhesive layer and the core material, a content of the epoxy group-containing unsaturated monomer in the epoxy group-containing polyolefin resin is preferably 3-30 wt. %, or more preferably 10-20 wt. % with respect to the total monomer components in the resin. Two or more kinds of the epoxy group-containing unsaturated monomer may be combined in use and in that case, it is only necessary that their total amount is within the aforementioned range.

A content of the aforementioned other monomers in the epoxy group-containing polyolefin resin is preferably 30 wt. % or less, or more preferably 10 wt. % or less with respect to the total monomer components in the resin. Two or more kinds of the other monomers may be combined in use and in that case, it is only necessary that their total amount is within the aforementioned range.

From the viewpoint of heat resistance and extrusion-moldability, the melting point of the epoxy group containing polyolefin resin preferably is preferably 50-105° C., or particularly 90-100° C. From the viewpoint of integral extrusion-moldability, the MFR of the epoxy group-containing polyolefin resin is preferably 1-20 g/10 min, or particularly more preferably 3-10 g/10 min.

The epoxy group-containing polyolefin resin can be manufactured by conventionally known methods such as a suspension polymerization method, a solution polymerization method and the like, or is available as a commercial product.

The present invention does not prohibit resins other than the epoxy group-containing polyolefin resin from being contained in the base resin within a range not undermining the adhesion.

A thickness of the adhesive layer is not particularly limited as long as the object of the present invention is achieved, and from the viewpoints of adhesion and productivity, or in order not to generate fracture, separation or the like on the surface during the bending, it is preferably 0.05-1.0 mm, or more preferably 0.1-0.5 mm.

Now, a manufacturing method of the bent product of this embodiment will be described.

Figure 6:
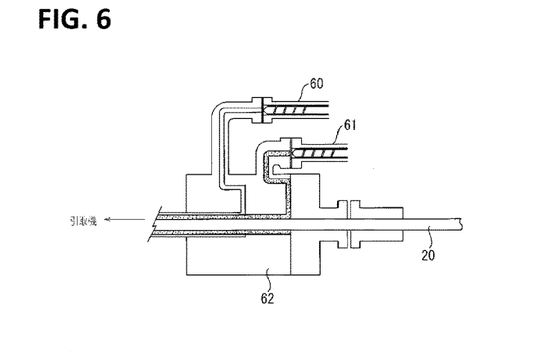
FIG. 6 is a schematic cross-sectional view of a co-extrusion type integral extrusion molding machine for manufacturing the integrally extrusion-molded body.

The integrally extrusion-molded body of this embodiment can be manufactured as follows. The aluminum core material can be manufactured by extrusion molding of aluminum or an aluminum alloy. The integrally extrusion-molded body is manufactured by so-called integral extrusion method in which the coating layer is integrated with the core material at the same time as the extrusion molding of the coating layer in terms of productivity, molding of a lengthy object, and constant product characteristics. At this time, the adhesive may be applied on the surface of the core material in advance by spraying, immersion and the like, and integral extrusion molding may be carried out together with the coating layer. Alternatively, the core material, the adhesive layer, and the coating layer may be integrally extrusion-molded. For example, in the co-extrusion type integral extrusion molding machine as illustrated in FIG. 6, the resins extruded from each of extruding machines 60 and 61 for melting/kneading the material forming each of the resin layers are stacked in a die 62 and at the same time, those layers are sequentially made to coat the fed-in core material 20 and integrated therewith. After the integration, it is usually cooled and cut to a desired dimension. Two extruding machines are used in FIG. 6, but this is not limiting and they may be installed as appropriate in accordance with the number of coating layers.

The bending of the aforementioned integrally extrusion-molded body can be performed at a normal temperature by known methods such as roller bending, pressing, and bending while pressing the material onto a bending die by using a so-called bender.

Figure 11:
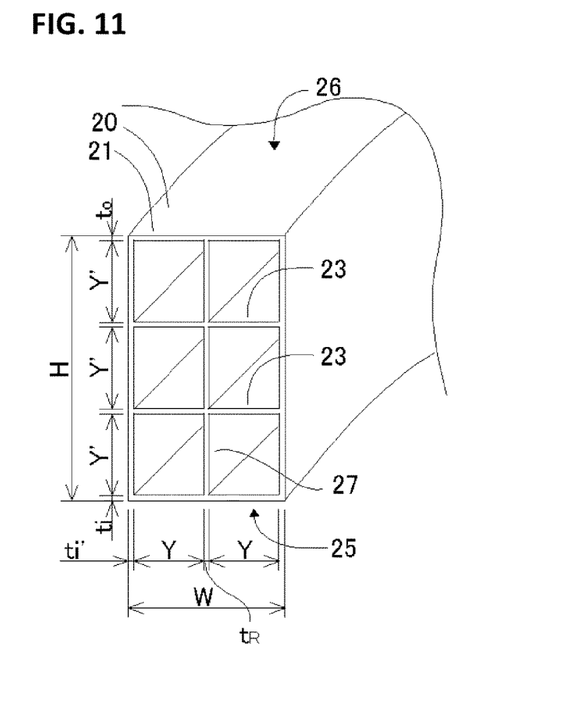
FIG. 11 is a view illustrating a structure of a core material of a bent product of a second embodiment of the present invention.

Now, a bent product which is a second embodiment of the present invention will be described on the basis of FIG. 11. FIG. 11 illustrates only a core material. In FIG. 11, a lower side in the figure corresponds to the inner side 25 of bending and an upper side in the figure corresponds to the outer side 26 of the bending.

Although not shown in FIG. 11, in the bent product of this embodiment, too, the coating layer 40 is formed on the outer surface of the core material 20 through the adhesive layer 30 as in the first embodiment. The core material 20 has the tubular peripheral wall 21 having a rectangular cross section and the two first partition walls 23 dividing an internal space of the peripheral wall in the long-diameter direction of the cross section and extending in the longitudinal direction of the core material. The core material 20 of this embodiment further has a second partition wall 27 dividing the internal space of the peripheral wall in the short-diameter direction of the cross section.

In the bent product of this embodiment, the long diameter in the cross section perpendicular to the longitudinal direction of the core material 20 is in parallel with the bending plane P, and the short diameter is orthogonal to the bending plane P. In this embodiment, the first partition wall 23 has a reinforcing function against deformation during the integral extrusion molding, and mainly the second partition wall 27 has a reinforcing function against generation of the appearance defect (defective shape) in the inner side portion 25 during the bending caused by compression deformation.

For the bent product 10 of this embodiment, the one similar to that in the first embodiment can be selected suitably in terms of a material and a thickness of the core material; presence and a treatment form of knurling of the core material; presence and a treatment form of anodic oxidation of the core material; a material and a thickness of the coating layer, and presence, a material, and a thickness of the adhesive layer.

A preferable range of the ratio Y (mm)/$t_i$ (mm) between the span (Y) of the second partition wall 27 and the thickness $t_i$ of the peripheral wall in the inner side portion of the bending and its reason are the same as those in the first embodiment. Moreover, a preferable range of the ratio H (mm)/$t_o$ (mm) between the cross-sectional height H of the core material 20 and the thickness $t_o$ of the peripheral wall in the outer side portion of the bending and its reason are the same as those in the first embodiment. Moreover, a preferable range of the ratio H (mm)/R (mm) between the cross-sectional height H of the core material and the radius of curvature R of the bending and its reason are the same as those in the first embodiment.

In the integrally extrusion-molded body suitable for manufacture of the bent product of this embodiment, the ratio Y/$t_{min}$ and the ratio H/$t_{min}$ are preferably set within the aforementioned ranges, respectively, with respect to the minimum value $t_{min}$ of the thickness t of the peripheral wall 21. That is because the direction of the bending is not limited as a result. Moreover, the ratio H/R is more preferably within the aforementioned range.

Figure 12:
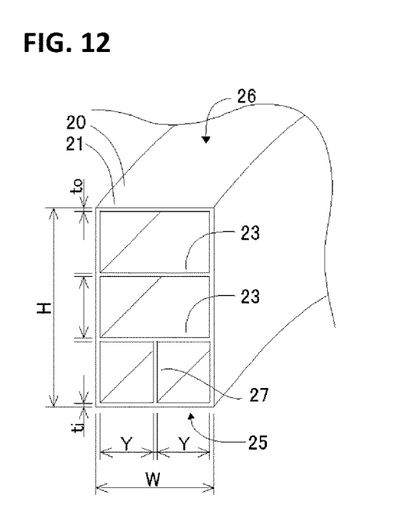
FIG. 12 is a view illustrating another example of a core material of the bent product of the second embodiment of the present invention.

Moreover, the second partition wall 27 of this embodiment may not be formed from the bending inner side portion 25 to the outer side portion 26 of the peripheral wall 21 as in FIG. 11, but may be provided between the bending inner side portion of the peripheral wall and the first partition wall 23 and provided so as to divide a space surrounded by the bending inner side portion of the peripheral wall and the first partition wall in the short-diameter direction as in FIG. 12.

The first partition wall 23 in this embodiment needs to be formed from a part of the peripheral wall to a portion faced with that in the peripheral wall in order to prevent deformation in the integral extrusion molding. Moreover, as described in Patent Document 2, a ratio between a span Y' of the first partition wall 23 and a thickness t' of the peripheral wall of a portion to which the first partition wall continues has a preferable range. Specifically, in order to bear a compression pressure in the integral extrusion molding, the cube of Y'(mm)/t' (mm) is preferably 5000 or less, more preferably 2500 or less, or particularly preferably 1500 or less. Moreover, considering a cost of the core material, the cube of Y'(mm)/t'(mm) is preferably 200 or more, or more preferably 400 or more.

The bent product of this embodiment can be manufactured by extrusion-molding the core material 20, by integrally extrusion-molding the core material and the coating layer, and by bending the obtained integrally extrusion-molded product similarly to the first embodiment.

Figure 13:
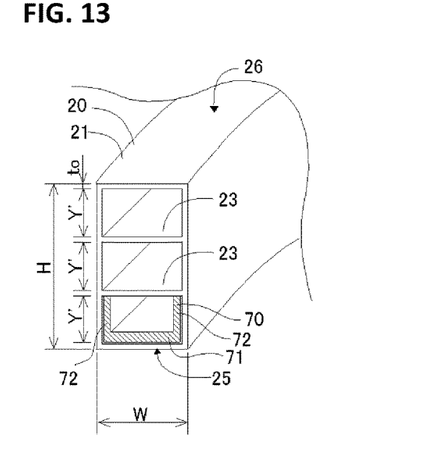
FIG. 13 is a view illustrating a structure of a core material and a reinforcing member of a bent product of a third embodiment of the present invention.

Now, a bent product which is a third embodiment of the present invention will be described on the basis of FIG. 13. FIG. 13 illustrates only a core material and a reinforcing member. In FIG. 13, a lower side in the figure corresponds to the inner side 25 of the bending and an upper side in the figure corresponds to the outer side 26 of the bending.

Though not shown in FIG. 13, in the bent product of this embodiment, too, the coating layer 40 is formed on the outer surface of the core material 20 through the adhesive layer 30 as in the first and second embodiments. The core material 20 has the tubular peripheral wall 21 having a rectangular cross section and the two first partition walls 23 dividing an internal space of the peripheral wall in a long-diameter direction of the cross section and extending in the longitudinal direction of the core material. The bent product 10 of this embodiment further has a reinforcing member 70 which is fitted/inserted into a space surrounded by the bending inner side portion of the peripheral wall and the first partition wall, that is, inserted closely without a shift and having a U-shaped cross section extending in the longitudinal direction of the peripheral wall.

In the bent product of this embodiment, the long diameter in the cross section perpendicular to the longitudinal direction of the core material 20 is in parallel with the bending plane P, and the short diameter is orthogonal to the bending plane P. In this embodiment, the first partition wall 23 has a reinforcing function against deformation during the integral extrusion molding, and mainly the reinforcing member 70 has a reinforcing function against generation of the appearance defect (defective shape) in the inner side portion 25 during the bending caused by compression deformation.

For the bent product 10 of this embodiment, the one similar to that in the first and second embodiments can be selected suitably in terms of a material and a thickness of the core material; presence and a treatment form of knurling of the core material; presence and a treatment form of anodic oxidation of the core material; a material and a thickness of the coating layer; and presence, a material, and a thickness of the adhesive layer.

A preferable range of the ratio H (mm)/$t_o$ (mm) between the cross-sectional height H of the core material 20 and the thickness $t_o$ of the peripheral wall in the outer side portion of the bending and its reason are the same as those in the first and second embodiments. Moreover, a preferable range of the ratio H (mm)/R (mm) between the cross-sectional height H of the core material and the radius of curvature R of the bending and its reason are the same as those in the first and second embodiments.

For the reinforcing member 70, aluminum or an aluminum alloy is preferably used as for the core material 20. Specifically, a material with a grade having favorable extrusion-moldablity as those used for an aluminum sash or a material with alloy numbers 6063 and 6060 according to JISH4100, for example, is preferable.

The reinforcing member 70 extends in the longitudinal direction of the bent product similarly to the core material. The reinforcing material in FIG. 13 has a channel-shaped cross section and has a backing surface 71 abutting on the inner side portion 25 of the bending of the peripheral wall 21 and two leg portions 72 bent and extending from its both ends. The other ends of the leg portions abut on the first partition wall 23. When the integrally extrusion-molded body is bent, as described above, a compressive stress is generated in the bending inner side portion of the peripheral wall, and the portion is to be shifted to the internal space side. In response to that, the backing surface abuts on the inner side portion of the peripheral wall from the internal space side and resists a force with which the peripheral wall is to be deformed by the backing surface and the leg portions, whereby generation of the appearance defect is prevented. That is, in this embodiment, mainly the reinforcing member 70 serves as a reinforcing means for preventing generation of the appearance defect in the bending inner side portion 25 in the peripheral wall.

Figure 14:
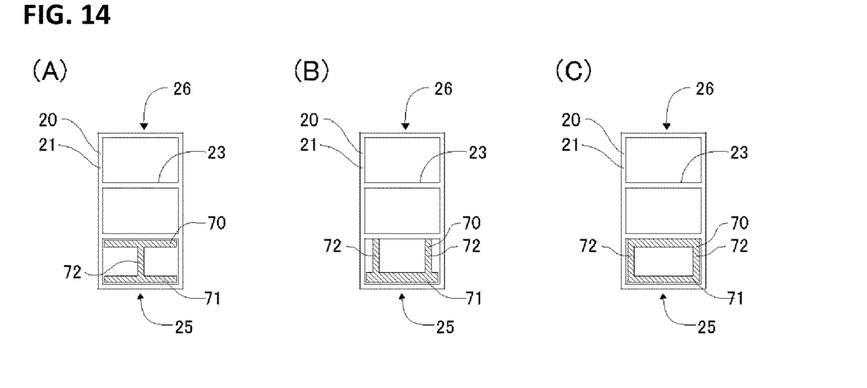
FIG. 14 are views illustrating other examples of the structure of the core material and the reinforcing member of the bent product of the third embodiment of the present invention.

A shape of the reinforcing member 70 is not limited to the channel-shaped cross section but may be various shapes illustrated in FIG. 14, for example. In any case, it has the backing surface 71 abutting on the inner side portion of the bending of the peripheral wall 21 and the two leg portions 72 bent and extending from its both ends. Among them, those with the channel-shaped cross sections are preferable in terms of case of manufacture and a cost.

A size of the reinforcing member 70 needs to be such that it is closely fitted in the internal space to which it is inserted. When the reinforcing member is inserted into the internal space, if a play is too large, the inner side portion of the peripheral wall is deformed during the bending. Therefore, the play generated when the reinforcing member is inserted into the internal space is preferably 1.0 mm or less or further preferably 0.5 mm or less.

A thickness of the reinforcing member 70 is 0.8-3.0 mm. If the reinforcing member is too thin, a reinforcement effect is insufficient, and production stability is poor in manufacture of the core material in extrusion molding of aluminum. On the other hand, if the reinforcing member is too thick, lightness and the like are deteriorated. From these viewpoints, the thickness of the reinforcing member is preferably 1.0-2.3 mm, or more preferably 1.2-1.8 mm.

In the first partition wall 23 in this embodiment, similarly to that in the second embodiment, the cube of the ratio Y'(mm)/t'(mm) between the span Y' of the first partition wall 23 and the thickness t' of the peripheral wall of the portion to which the first partition wall continues is preferably 5000 or less, more preferably 2500 or less, or particularly preferably 1500 or less. Moreover, the cube of Y'(mm)/t'(mm) is preferably 200 or more, or more preferably 400 or more.

The bent product of this embodiment can be manufactured as follows. First, the core material 10 is extrusion-molded, and the core material and the coating layer are integrally extrusion-molded. In the obtained integrally extrusion-molded body, the reinforcing member 70 is fitted/inserted into the space surrounded by the peripheral wall 21 which becomes the inner side 25 of the bending and the first partition wall 23. Then, the integrally extrusion-molded body containing the reinforcing member is bent.

EXAMPLE

As a hollow core material, a hollow aluminum core material having a substantially rectangular cross section as illustrated in FIG. 2 was manufactured by extrusion molding. However, the number of the partition walls is different among Examples and Comparative examples, that is, 1, 2, 3 or 6. On the aluminum core material, after a groove extending in the longitudinal direction was formed by knurling, an oxide film was formed by alumite treatment (without sealing). As a material of the aluminum alloy, that with an extrusion grade and an alloy number 6063 was used. A plate groove pitch was 0.5 mm, and a groove depth was 0.1 mm. A sulfuric acid method was used for the alumite treatment.

For a pellet for a coating layer, 30 weight parts of wood flour (particle size of 100 meshes or less), 5.2 weight parts of a brown coloring agent, and 15 weight parts of a filling agent (talc) were mixed in 100 weight parts of maleic acid modified polypropylene resin (approximately 2 wt. % of maleic acid content, a melting point at 150° C., and MFR of approximately 10 g/min). The mixture was melted and extruded and then, cooled and roughly crushed so as to manufacture the pellet.

For the adhesive layer, Bond Fast (registered trademark) 7B (by Sumitomo Chemical Co., Ltd., ethylene-glycidyl methacrylate-vinyl acetate (copolymerization ratio (weight ratio) 83:12:5), MFR 7 g/10 min, melting point at 95° C.) was used as an epoxy group-containing polyolefin resin.

The integrally extrusion-molded body was manufactured by the co-extrusion type integral extrusion molding machine as illustrated in FIG. 6. A material for the coating layer and a material for the adhesive layer were extruded at the same time from an extruding machine 60 and an extruding machine 61, respectively, laminated/coated on the aluminum core material 20 in the die 62 so as to manufacture the integrally extrusion-molded body having the adhesive layer and the coating layer on the whole part in the circumferential direction on the outer surface of the aluminum core material. An extrusion condition and a core material condition are as follows:

Extruding machine 60: 40Φ, uniaxial extruding machine (extrusion temperature: approximately 140° C.)

Extruding machine 61: 50Φ, uniaxial extruding machine (extrusion temperature: approximately 165° C.)

The aluminum core material was preliminarily heated (approximately 100° C.) immediately before insertion into the die.

In Examples 1-5 and Comparative examples 1-10, the manufactured integrally extrusion-molded bodies were subjected to the bending by roller bending so that the long-diameter direction of the cross section is orthogonal to the bending plane so as to manufacture the bent product. In Examples 6 and 7, the reinforcing member having the channel-shaped cross section was fitted/inserted into the manufactured integrally extrusion-molded body in a direction illustrated in FIG. 13, and bending was performed by roller bending so that the long-diameter direction of the cross section is in parallel with the bending plane so as to manufacture the bent product. The reinforcing member used in Examples 6 and 7 was manufactured by extrusion molding of aluminum, and a thickness of the backing surface was 2.3 mm and a thickness of the leg portion was 1.5 mm.

Appearances of the obtained bent products were evaluated visually. Evaluation standards were as follows:

For the inner side of the bent portion:
○: favorable appearance;
Δ: slight wrinkles are found on the surface of the coating layer; and
x: a dent is found in the core material.

For the outer side of the bent portion:
○: favorable appearance;
Δ: slight hairline defects are found on the surface of the coating layer; and
x: a linear groove is found on the surface of the coating layer.

Table 1 shows dimensions, bending radiuses, and appearance evaluation results of the integrally extrusion-molded bodies. Favorable appearances could be obtained by all of Examples 1-5. In Comparative examples 1-7, dents were found in the inner side of the bent portions. In Comparative examples 8-10, thickness of the peripheral walls are difference between the inner side portions and the outer side portions of the bending. In Comparative examples 8-10, though the appearances of the inner side portions of the bending were favorable, since the peripheral wall thicknesses are large, lightness and workability were deteriorated, which is not preferable. In Comparative example 10, a hairline defect was found in the outer side portion of the bending. A cause for that is considered to be a possibility that the neutral surface (24 in FIG. 5) during the bending was moved closer to the inner side since the thickness $t_i$ of the peripheral wall in the inner side portion of the bending is as large as 3.5 mm.

In Examples 6 and 7, the appearance defect in the bending inner side portion of the peripheral wall is prevented by the reinforcing member, and the second partition wall as the reinforcing means against the appearance defect is not provided, and thus, the span Y for such partition wall is not considered. For Examples 6 and 7, the span Y and the ratio Y/t for the first partition wall was indicated in the table for reference. In Examples 6 and 7, six bent products were manufactured with the bending radiuses R of 1007, 1081, 1155, 1229, 1303, and 1377 mm, respectively, and favorable appearances were obtained from them all.

In all Examples and Comparative examples, the appearances were not changed by outdoor exposure for approximately 7 days.

|  |  | Unit | Example 1 | Example 2 | Example 3 | Example 4 | Example 5 | Example 6 | Example 7 |
|---|---|---|---|---|---|---|---|---|---|
| Bending direction (long diameter of the section is "X" to blending plane) |  |  | "X" = orthogonal | orthogonal | orthogonal | orthogonal | orthogonal | parallel | parallel |
| Reinforcing means |  |  | first partition wall | first partition wall | first partition wall | first partition wall | first partition wall | reinforcing member | reinforcing member |
| Number of first partition wall |  |  | 2 | 2 | 2 | 2 | 6 | 1 | 2 |
| Thickness of peripheral wall | t | mm | 1.6 | 1.6 | 1.2 | 1.2 | 1.6 | 1.5 | 1.5 |
|  | ti | mm | 1.6 | 1.6 | 1.2 | 1.2 | 1.6 | 1.5 | 1.5 |
|  | to | mm | 1.6 | 1.6 | 1.2 | 1.2 | 1.6 | 1.5 | 1.5 |
| Thickness of partition wall tR |  | mm | 1.2 | 1.2 | 1.1 | 1.1 | 1.2 | 1.5 | 1.5 |
| Span of partition walls Y |  | mm | 14.0 | 14.0 | 14.0 | 14.0 | 15.3 | 21.5* | 14 * |
| Y/ti |  |  | 8.8 | 8.8 | 11.7 | 11.7 | 9.6 | 14.3* | 9.3 * |
| Cross-sectional height of core material H | H/to | mm | 27.6 | 27.6 | 21.5 | 21.5 | 27.6 | 47.5 | 48.0 |
|  |  |  | 17.3 | 17.3 | 17.9 | 17.9 | 17.3 | 31.3 | 32.0 |
| Width of core material W |  | mm | 47.6 | 47.6 | 46.5 | 46.5 | 117.6 | 28.0 | 29.0 |
| Thickness of adhesive layer |  | mm | 0.2 | 0.2 | 0.2 | 0.2 | 0.2 | 0.2 | 0.2 |
| Thickness of coating layer |  | mm | 1.0 | 1.0 | 1.0 | 2.0 | 1.0 | 1.0 | 1.0 |

-continued

| | | | | | | | | |
|---|---|---|---|---|---|---|---|---|
| Bending radius | mm | 500 | 400 | 780 | 780 | 500 | 1007-1337 | 1007-1337 |
| H/R | | 0.055 | 0.069 | 0.028 | 0.028 | 0.055 | 0.047-0.035 | 0.048-0.036 |
| Appearance inner side of bending | | ○ | ○ | ○ | ○ | ○ | ○ | ○ |
| Outer side of bending | | ○ | ○ | ○ | ○ | ○ | ○ | ○ |

| | | Unit | Comparative Example 1 | Comparative Example 2 | Comparative Example 3 | Comparative Example 4 | Comparative Example 5 |
|---|---|---|---|---|---|---|---|
| Bending direction (long diameter of the section is "X" to bending plane) | | | "X" = orthogonal | orthogonal | orthogonal | orthogonal | orthogonal |
| Number of first partition wall | | | 1 | 1 | 1 | 1 | 1 |
| Thickness of peripheral wall | t | mm | 1.5 | 1.1 | 1.1 | 1.1 | 1.1 |
| | $t_i$ | mm | 1.5 | 1.1 | 1.1 | 1.1 | 1.1 |
| | $t_o$ | mm | 1.5 | 1.1 | 1.1 | 1.1 | 1.1 |
| Thickness of partition wall $t_R$ | | mm | 1.2 | 1.0 | 1.0 | 1.0 | 1.0 |
| Span of partition walls Y | | mm | 21.7 | 22.2 | 22.2 | 22.2 | 22.2 |
| $Y/t_i$ | | | 14.5 | 20.2 | 20.2 | 20.2 | 20.2 |
| Cross-sectional height of core material H | | mm | 27.6 | 27.6 | 27.6 | 27.6 | 27.6 |
| $H/t_o$ | | | 18.4 | 25.1 | 25.1 | 25.1 | 25.1 |
| Width of core material W | | mm | 47.6 | 47.6 | 47.6 | 47.6 | 47.6 |
| Thickness of adhesive layer | | mm | 0.2 | 0.2 | 0.2 | 0.2 | 0.2 |
| Thickness of coating layer | | mm | 1.0 | 1.0 | 1.0 | 1.0 | 1.0 |
| Bending radius | | mm | 500 | 500 | 700 | 900 | 1100 |
| H/R | | | 0.055 | 0.056 | 0.039 | 0.031 | 0.025 |
| Appearance inner side of bending | | | × | × | × | × | × |
| Outer side of bending | | | ○ | ○ | ○ | ○ | ○ |

| | | Unit | Comparative Example 6 | Comparative Example 7 | Comparative Example 8 | Comparative Example 9 | Comparative Example 10 |
|---|---|---|---|---|---|---|---|
| Bending direction (long diameter of the section is "X" to bending plane) | | | orthogonal | orthogonal | orthogonal | orthogonal | |
| Number of first partition wall | | | 3 | 3 | 2 | 2 | |
| Thickness of peripheral wall | t | mm | 1.8 | 1.4 | 1.6-2.5 | 1.6-2.5 | |
| | $t_i$ | mm | 1.8 | 1.4 | 2.5 | 1.6 | |
| | $t_o$ | mm | 1.8 | 1.4 | 1.6 | 2.5 | |
| Thickness of partition wall $t_R$ | | mm | 1.3 | 1.4 | 1.2 | 1.2 | |
| Span of partition walls Y | | mm | 27.5 | 28.6 | 14.0 | 14.0 | |
| $Y/t_i$ | | | 15.3 | 20.4 | 5.6 | 8.8 | |
| Cross-sectional height of core material H | | mm | 27.6 | 48.6 | 28.6 | 28.6 | |
| $H/t_o$ | | | 15.3 | 34.7 | 17.9 | 11.4 | |
| Width of core material W | | mm | 120.0 | 123.0 | 48.6 | 48.6 | |
| Thickness of adhesive layer | | mm | 0.2 | 0.2 | 0.2 | 0.2 | |
| Thickness of coating layer | | mm | 1.0 | 2.5 | 1.2 | 1.2 | |
| Bending radius | | mm | 500 | 500 | 780 | 780 | |
| H/R | | | 0.065 | 0.097 | 0.037 | 0.037 | |
| Appearance inner side of bending | | | × | Δ ~ × | ○ | ○ | ○ |
| Outer side of bending | | | ○ | ○ ~ Δ | ○ | ○ | Δ |

The present invention is not limited to the aforementioned embodiments and Examples but is capable of various deformations within a scope of its technical idea.

Figure 7:
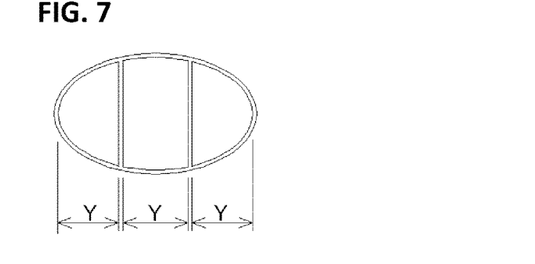
FIG. 7 is a view illustrating another example of a cross-sectional structure of the core material of the bent product of the first embodiment of the present invention.

For example, the cross-sectional shape of the core material is not limited to a rectangle but may be an approximate circle, an approximate ellipse, an approximate regular square and the like. In this case, the span Y of the partition wall can also be similarly defined as a distance between two straight lines in parallel with the partition wall sandwiching the internal space divided by the partition wall in the cross section perpendicular to the longitudinal direction of the core material (FIG. 7). If the cross section is circular, either one of the diameters in parallel or orthogonal to the bending plane may be considered as a long diameter and the other as a short diameter. If the cross section is a regular square, either one of the sides may be considered as a long diameter and a side adjacent to that as a short diameter.

Figure 8:
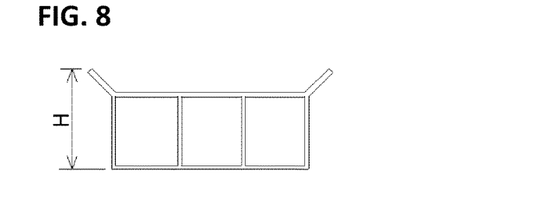
FIG. 8 is a view illustrating another example of the cross-sectional structure of the core material of the bent product of the first embodiment of the present invention.

Moreover, the core material may have a portion protruded on the outer side of the peripheral wall, for example. In this case, the cross-sectional height H of the core material can also be similarly defined as a distance between the two straight lines perpendicular to the bending plane sandwiching the outer shape of the core material in the cross section perpendicular to the longitudinal direction of the core material (FIG. 8).

Moreover, the thicknesses t, $t_1$, and $t_o$ of the peripheral wall do not have to be uniform but may be locally different, for example. In that case, t, $Y/t_i$, and $H/t_o$ only need to be within a specified range with respect to thickness of the thinnest portion in accordance with the object of the present invention. Moreover, there may be a locally thick portion for screwing or the like in a part of the peripheral wall, but in that case, the thickness t of the peripheral wall means a thickness of a portion excluding the locally thick portion.

Figure 9:
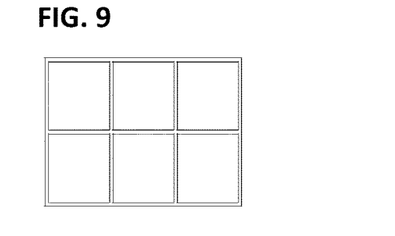
FIG. 9 is a view illustrating another example of the cross-sectional structure of the core material of the bent product of the first embodiment of the present invention.

Moreover, the number of the partition walls is not particularly limited, and the shapes thereof may be formed by being crossed each other such that the cross section has a lattice state as illustrated in FIG. 9, for example. In this case, too, since Y, $t_1$, H, and $t_o$ are defined in accordance with the bending direction, it is only necessary that $Y/t_i$ and $H/t_o$ are within the range specified by the present invention. Moreover, it is more preferable that H/R is within a range specified by the present invention.

Moreover, the spans of the plurality of partition walls may be different from each other, for example. In that case, in accordance with the object of the present invention to prevent generation of the appearance defect in the bending, it is only necessary that the ratio Y/t with the thickness t of the peripheral wall is within the specified range assuming that the largest span is Y.

Moreover, the coating layer and/or the adhesive layer may be provided on a part of the outer surface of the core material, for example. However, the coating layer and the adhesive layer are preferably provided on the whole of the outer surface of the core material in terms of adhesion among the core material, the adhesive layer, and the coating layer.

INDUSTRIAL APPLICABILITY

The bent product of the integrally extrusion-molded body incorporating a metal core material of the present invention is usable as construction members including a decorative material for construction, a handrail for construction, an antitheft window grate, a deck material, a balcony louver and the like and as members for furniture, household goods, lighting equipment and the like.

REFERENCE NUMERALS 10 bent product
20 core material
21 peripheral wall
22 groove
23 first partition wall
24 neutral surface during bending
25 inner side of bending (compressive side)
26 outer side of bending (tensile side)
27 second partition wall
30 adhesive layer
40 coating layer
50 bent product
51 dent defect
52 linear groove
53 hairline defect
60, 61 extruding machine
62 die
70 reinforcing member
71 backing surface
72 leg portion
t, t' thickness of peripheral wall
$t_i$ thickness of peripheral wall in inner side portion of bending
$t_o$ thickness of peripheral wall in outer side portion of the bending
$t_{min}$ minimum value of thickness
$t_R$ thickness of partition wall
Y, Y' span of partition walls
H sectional height of core material
W sectional width of core material
C compressive stress
T tensile stress
d depth of groove
p pitch of groove
O bending center
A center axis of bent product
R bending radius
P bending plane

The invention claimed is:
1. A bent product obtained by bending an integrally extrusion-molded body, the bent product comprising:
a metal core material comprising a tubular peripheral wall and a first partition wall dividing an internal space of the tubular peripheral wall in a long-diameter direction of a cross section perpendicular to a longitudinal direction of the tubular peripheral wall and extending in the longitudinal direction of the tubular peripheral wall; and
a coating layer formed on an outer surface of the core material and containing at least a thermoplastic resin,
wherein a thickness of the tubular peripheral wall is in a range from 0.8 mm to 2.3 mm,
wherein a reinforcing means is provided on an internal space side of an inner side portion of a bending of the tubular peripheral wall, and
wherein a ratio H (mm)/R (mm) between a cross-sectional height (H) of the core material and a radius of curvature (R) of the bending is 0.09 or less.

2. The bent product according to claim 1, wherein a bending plane of the bending is substantially orthogonal to the long-diameter direction of the cross section perpendicular to the longitudinal direction of the tubular peripheral wall,
wherein the reinforcing means comprises the first partition wall, and
wherein a ratio Y (mm)/$t_i$ (mm) between a span (Y) of the first partition wall and a thickness ($t_i$) of the tubular peripheral wall in the inner side portion of the bending is 12.0 or less.

3. The bent product according to claim 1, wherein a bending plane of the bending is substantially in parallel with the long-diameter direction of the cross section perpendicular to the longitudinal direction of the tubular peripheral wall,
wherein the reinforcing means comprises a second partition wall provided in the metal core material,
wherein the second partition wall divides a space surrounded by the inner side portion of the bending of the tubular peripheral wall and the first partition wall in a short-diameter direction of the cross section perpendicular to the longitudinal direction of the tubular peripheral wall and extends in the longitudinal direction of the tubular peripheral wall, and
wherein a ratio Y (mm)/$t_i$ (mm) between a span (Y) of the second partition wall and the thickness ($t_i$) of the tubular peripheral wall in the inner side portion of the bending is 12.0 or less.

4. A bent product obtained by bending an integrally extrusion-molded body, the bent product comprising:
a metal core material comprising a tubular peripheral wall and a first partition wall dividing an internal space of the tubular peripheral wall in a long-diameter direction of a cross section perpendicular to a longitudinal direction of the tubular peripheral wall and extending in the longitudinal direction of the tubular peripheral wall; and
a coating layer formed on an outer surface of the core material and containing at least a thermoplastic resin,
wherein a thickness of the tubular peripheral wall is in a range from 0.8 mm to 2.3 mm,
wherein a reinforcing means is provided on an internal space side of an inner side portion of a bending of the tubular peripheral wall,
wherein the bending plane of the bending is substantially in parallel with the long-diameter direction of the cross section perpendicular to the longitudinal direction of the tubular peripheral wall, wherein the reinforcing means comprises a reinforcing member fitted/inserted into a space surrounded by the inner side portion of the bending of the tubular peripheral wall and the first partition wall and extending in the longitudinal direction of the tubular peripheral wall, and wherein the reinforcing member includes:
a thickness of 0.8-3.0 mm;
a backing surface abutting on the inner side portion of the bending of the tubular peripheral wall; and
a leg portion in parallel with the bending plane and formed continuously from the backing surface.

5. The bent product according to claim 1, wherein a ratio $H$ (mm)/$t_o$ (mm) between a cross-sectional height (H) of the core material and a thickness ($t_o$) of the tubular peripheral wall in an outer side portion of the bending is 18.0 or less.

6. The bent product according to claim 1 wherein the core material comprises aluminum.

7. A bent product obtained by bending an integrally extrusion-molded body, the bent product comprising:
a metal core material comprising a tubular peripheral wall and a first partition wall dividing an internal space of the tubular peripheral wall in a long-diameter direction of a cross section perpendicular to a longitudinal direction of the tubular peripheral wall and extending in the longitudinal direction of the tubular peripheral wall; and
a coating layer formed on an outer surface of the core material and containing at least a thermoplastic resin,
wherein a thickness of the tubular peripheral wall is in range from 0.8 mm to 2.3 mm,
wherein a reinforcing means is provided on an internal space side of an inner side portion of a bending of the tubular peripheral wall, and
wherein the coating layer contains at least a thermoplastic resin and wood flour.

8. The bent product according to claim 1, wherein the thermoplastic resin contained in the coating layer comprises a polyolefin resin.

9. The bent product according to claim 1, wherein a thickness of the coating layer is in a range from 0.1 mm to 5 mm.

10. The bent product according to claim 1, further comprising an adhesive layer formed between the core material and the coating layer.

11. The bent product according to claim 10, wherein the adhesive layer contains at least a copolymer of an α-olefin and an epoxy group-containing unsaturated monomer.

12. The bent product according to claim 10, wherein a thickness of the adhesive layer is in a range from 0.05 mm to 1.0 mm.

13. The bent product according to claim 1, wherein a cross-sectional shape of the core material is substantially rectangular.

14. The bent product according to claim 7, wherein a bending plane of the bending is substantially orthogonal to the long-diameter direction of the cross section perpendicular to the longitudinal direction of the tubular peripheral wall,
wherein the reinforcing means comprises the first partition wall, and
wherein a ratio $Y$ (mm)/$t_i$ (mm) between a span (Y) of the first partition wall and a thickness ($t_i$) of the tubular peripheral wall in the inner side portion of the bending is 12.0 or less.

15. The bent product according to claim 7, wherein a bending plane of the bending is substantially in parallel with the long-diameter direction of the cross section perpendicular to the longitudinal direction of the tubular peripheral wall,
wherein the reinforcing means comprises a second partition wall provided in the metal core material,
wherein the second partition wall divides a space surrounded by the inner side portion of the bending of the tubular peripheral wall and the first partition wall in a short-diameter direction of the cross section perpendicular to the longitudinal direction of the tubular peripheral wall and extends in the longitudinal direction of the tubular peripheral wall, and
wherein a ratio $Y$ (mm)/$t_i$ (mm) between a span (Y) of the second partition wall and the thickness ($t_i$) of the tubular peripheral wall in the inner side portion of the bending is 12.0 or less.

* * * * *